United States Patent [19]

DiBartolo

[11] Patent Number: 4,742,846
[45] Date of Patent: May 10, 1988

[54] DIRECTING-ACTING, DIFFERENTIAL PISTON RELIEF VALVE

[75] Inventor: Ernest A. DiBartolo, Sarasota, Fla.

[73] Assignee: Sun Hydraulics Corp., Sarasota, Fla.

[21] Appl. No.: 69,833

[22] Filed: Jul. 6, 1987

Related U.S. Application Data

[63] Continuation of Ser. No. 699,904, Feb. 8, 1985, abandoned.

[51] Int. Cl.[4] .............................................. F16K 21/10
[52] U.S. Cl. .................................. 137/514.5; 137/469
[58] Field of Search ................... 137/469, 514, 514.5; 277/165

[56] References Cited

U.S. PATENT DOCUMENTS

| | | | |
|---|---|---|---|
| 446,782 | 2/1891 | Loftus | 137/514.5 |
| 1,962,549 | 6/1934 | Bjorklund | 137/514.5 |
| 2,323,021 | 6/1943 | Ernst | 137/514.5 |
| 2,351,190 | 6/1944 | Carlson | 137/469 |
| 2,674,260 | 4/1954 | Thrush | 137/469 |
| 2,793,656 | 5/1957 | Frain et al. | 137/514.5 |
| 3,054,420 | 9/1962 | Williams | 137/469 |
| 3,086,551 | 4/1963 | Gordon | 137/514.5 |
| 3,103,230 | 9/1963 | Kutsche | 137/514.5 |
| 3,131,720 | 5/1964 | Horvath | 137/469 |
| 3,341,210 | 9/1967 | Vick | 277/165 |
| 3,487,852 | 1/1970 | Kikendall | 137/514.5 |
| 3,610,276 | 10/1971 | Seelman et al. | 137/514.5 |
| 3,626,975 | 12/1971 | Bobst et al. | 137/469 X |
| 3,636,824 | 1/1972 | Clark | 277/165 |
| 4,406,302 | 9/1983 | Olesen | 137/514.5 |

FOREIGN PATENT DOCUMENTS

| | | | |
|---|---|---|---|
| 2435911 | 4/1975 | Fed. Rep. of Germany | 137/514.5 |
| 181461 | 6/1966 | U.S.S.R. | 137/514.5 |

*Primary Examiner*—John Rivell
*Attorney, Agent, or Firm*—Charles J. Prescott; Raymond H. Quist

[57] ABSTRACT

A direct-acting, differential piston relief valve has a spring chamber pressurized with fluid from a passage through the piston. The fluid within the chamber is at the same pressure as that at the inlet valve and provides a valve closing pressure against the inner face of the piston. The piston face at the inlet valve has an annular extension. The inner circumference of this extension meets the spherical valve seat when the valve is closed. The diameter of the inner face of the piston is smaller than the diameter of the piston face annular extension. Inlet pressure working on this area difference produces the hydraulic force which is opposed by the spring. No piston face area is exposed to forces tending to close the valve due to Bernoulli effects when the valve begins to open. The spring within the spring chamber has spring guides at each end which contain a ball. The ball transmits the spring force to the piston on one end and a sealed closure at the other end.

13 Claims, 1 Drawing Sheet

DIRECTING-ACTING, DIFFERENTIAL PISTON RELIEF VALVE

This is a continuation of application Ser. No. 699,904, filed Feb. 8, 1985, now abandoned.

BACKGROUND OF THE INVENTION

This invention relates generally to a relief valve and more particularly to a direct-acting, differential piston type relief valve.

Direct-acting, differential piston relief valves are used to provide a quick opening for excessive hydraulic pressure. They are characterized by a structure in which the regulated hydraulic pressure is applied directly to a primary piston area. The primary piston area is annular and measured in terms of the difference in areas resulting from the piston seating area and either the piston outside diameter or a defined smaller internal diameter. By this method, a large seating diameter is achieved, providing good flow capacity, and operating forces are reduced to provide high pressure capability in a reasonably small package. The force exerted on the piston annular area as a result of the hydraulic pressure tends to move the piston away from the source of the pressure, thereby unseating the valve to relieve the pressure. This opening pressure is typically opposed by a spring. Appropriate selection of the spring force and piston areas will provide a relief valve which will theoretically open at a desired pressure and close when the pressure falls below it.

A primary problem with currently available differential relief valves is they are prone to instability at extremely low flows and even at any flow when the downstream or outlet port is pressurized. Low flow instability involves the piston face to seat relationship and the effect of forces exerted on the piston which develop as it moves away from the seat in relieving extremely low flows. Those skilled in the art are familiar with and understand the theorem demonstrated by Daniel Bernoulli relating fluid flow and the principle of conservation of energy. As a relief valve piston leaves the seat, system kinetic energy ($V^2/2$ g) changes from zero to some value greater than zero. The theorem dictates that there must be a corresponding decrease in pressure or static energy as kinetic energy increases. This phenomenon is confined to the region between the fixed seat and moveable piston where an orifice is effectively created when the piston begins to move away. Any piston area exposed to this reduced pressure tends to move toward it, causing the valve to close. Once pressure redevelops, the piston moves back again and the cycle is repeated. The result is high frequency oscillation as the valve opens and closes evidenced by an objectionable and potentially destructive scream. What is desired, of course, is a valve which will pass extremely low flows without resulting opening and closing cycles.

Instability which is caused by back pressure at the outlet ports can occur at any flow rate and involves the nature of the forces which are exerted upon the piston and the character of damping achieved by the chamber having fluid displaced by the moving piston. For example, a typical differential relief valve has a piston and seat arrangement at the outlet port with a passage having an orifice passing through the piston to the spring chamber behind the piston. Fluid at the outlet pressure consequently has access to the spring chamber and, if it fills the spring chamber and no air is present, it can provide viscous damping. The magnitude and nature of pressure in the spring chamber can vary widely because its access to downstream pressure is at the piston-seat area of the valve. Flow at this point is at high velocity and turbulent. Piston forces are associated with flow and are unpredictable. All valves require some damping. It may be as little as that afforded by a piston displacing a uniform, viscous fluid. If air is present in the damping chamber, the damping is not reliable. If the chamber is at low pressure, rapid piston movement can aggravate the situation by generating pressures that are less than atmospheric. Air can be pulled out of solution from oil that is present and the system degenerates to the point where instability is unavoidable. Damping with an air-oil mixture in a low pressure environment is questionable at best. To have any effect at all, the orifice size must be extremely small by comparison with that required for pressure viscous damping (where only oil with no undissolved air will pass through the orifice). A valve which has its spring or damping chamber referenced to downstream pressure is, of course, sensitive to flow forces exerted on the piston ends as turbulent, high velocity fluid exits the valve. While it is possible to achieve conditions of pressure and flow whereby the valve is stable, a change in downstream pressure can change completely the balance of forces which existed prior to the change. For instance, when this type of valve is relieving directly to reservoir, downstream pressure is very low (essentially zero) while spring chamber pressure can be (and frequently is) less than atmospheric. This phenomenom is caused by venturi action (once more, Bernoulli's theorem) as relieved fluid passes the piston end at high velocity. Now, if a restriction is presented to downstream flow, downstream pressure will increase. However, partial vacuum can persist in the spring chamber because venturi action continues, even with rising downstream pressure. When this pressure rises to a level where it overcomes the Bernoulli effect on the piston end, the spring chamber pressure changes suddenly from a partial vacuum to a positive value with a dramatic change in forces which act upon large piston areas. The valve cycles closed and open, violently, at a frequency and magnitude which are proportional to the energy being dissipated.

The industry has endeavored to solve the instability problem in differential piston relief valves by increasing friction and using viscous damping. Some viscous damping is desirable in all valves to assure that a valve has inherent stability. Increasing friction, however, has a detrimental effect on hysteresis.

Hysteresis is represented by graphing pressure and flow rate for a valve as the valve goes from a closed position to fully open and back to closed. During opening a valve will have a lower flow at a particular pressure than it will during closing. Increasing friction, such as by increasing sealing area between a piston and the cylinder in which it moves, results in a force which adds to the spring force in resisting opening of the valve, but also substracts from or opposes spring force in reclosing, resulting in hysteresis. The effect is most dramatic in the difference between set pressure at which the valve begins to open, and reseat pressure when the valve fully closes. A reseat pressure which is 75% or less of set pressure is not uncommon in the industry. Sealing is, of course, necessary to prevent leakage, so that some hysteresis is inevitable and, if not excessive, desirable from the standpoint of stability.

To illustrate the problem that excessive hysteresis presents, consider a system to protect a load holding circuit of 2500 psi, i.e. the pressure must not fall below this amount. The valve reseat pressure must therefore be set at 2500 psi which, because of hysteresis, results in a 3333 psi opening pressure (using a valve having a reseat of 75% of set pressure). Thus the circuit must be exposed to potentially damaging pressure peaks of up to 3333 psi to maintain the necessary load holding pressure.

In most commonly used hydraulic valves it is customary to have the inlet or high pressure at the center or end port of the valve and the lower or exhaust pressure at one or more side ports. The reverse is true with currently available differential piston relief valves, increasing the possibility of improper valve installation; an additional problem with currently available valves.

SUMMARY OF THE INVENTION

A direct-acting, differential relief valve has a central inlet pressure port and a configuration for the piston face adjacent to the flow path of fluid from the inlet port and past the piston seat to the outlet ports. This configuration eliminates piston face area in the flow path. The spring which contributes to the valve closing force is located in a chamber which is pressurized with fluid at the pressure being regulated. This pressure acts against piston area on the spring chamber side and, with the spring force, opposes the same pressure acting on a larger piston face area on the opposite side of the piston. Pure pressure forces are exerted on each end of the moving piston, their difference being the differential area force which is opposed by the spring. These forces are steady and stable because they are not affected by flow through the valve. Hysteresis effects are minimized by low friction seals, small seal friction diameters and by spring mountings which result in an axial force without sidewise components. The resultant valve exhibits superior performance characteristics with regard to stability, accuracy and speed of response.

DETAILED DESCRIPTION OF THE INVENTION

Figure 1:
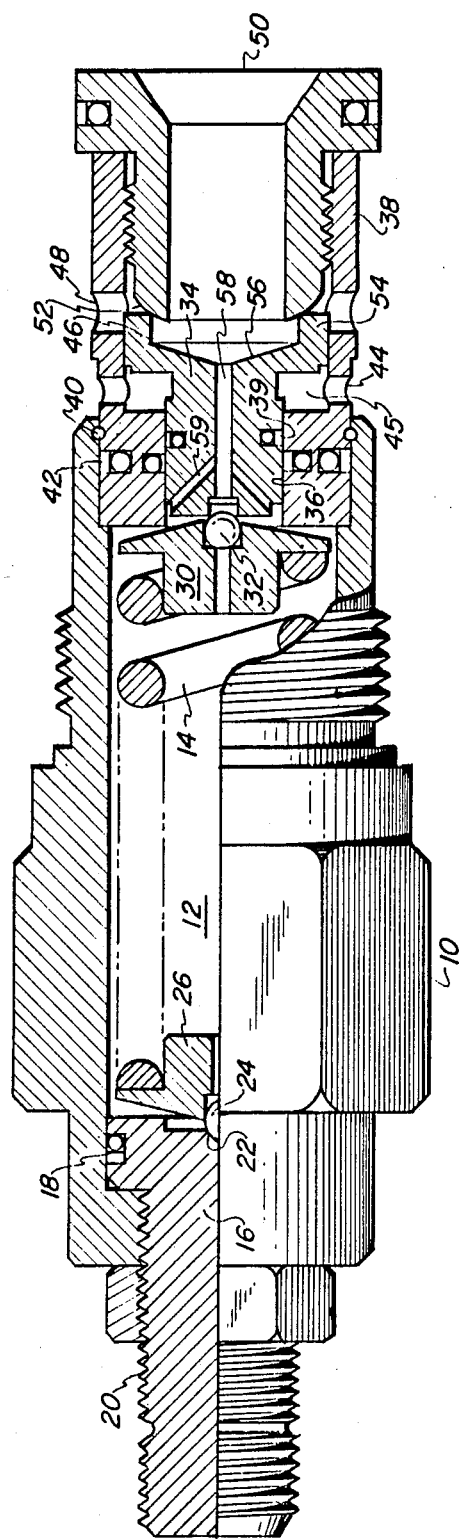
FIG. 1 depicts the relief valve of this invention partially in cross-section.

Referring to the drawing, body 10 has an axially extending spring chamber 12 with spring 14 contained therein. Spring chamber closure 16, having seal 18, has threads 20 which mate with corresponding threads in body 10 to permit adjustment of the spring force exerted by spring 14 while preventing leakage of the high pressure fluid which will be contained in spring chamber 12. Recess 22 in the center of spring chamber closure 16 centrally locates ball 24 secured in spring guide 26. Ball 24 is used to provide a spherical surface on spring guide 26 although other means for providing this surface may be used. Spring guide 30 with ball 32 at the other end of spring 14 has the same structure. Although it may not be apparent from a cursory glance at the drawing, ball 32 provides the only mechanical means for transmitting the spring force of spring 14 to piston 34. This is important in the present invention which achieves much of its efficacy from the low friction of the moving parts. If the spring force exerted on piston 34 is not completely axially oriented, i.e. if it contains sidewise force components, then piston 34 will tend to bind in piston cylinder 36 or have higher frictional forces opposing its movement in piston cylinder 36. A spring does not deliver a completely axially directed force and the use of the ball-containing spring guides tends to eliminate sidewise force components.

This same friction reduction construction is employed in seal 39 which includes an inner O-ring and an outer ring seal of low friction material such as Teflon. A suitable ring seal is identified as Glyd Ring available from Shambam Corporation. It should also be noted that this structure provides a bi-directional seal, i.e. it seals both with pressure drop from chamber 12 to 45 and the reverse, when back pressure is applied to the valve. (As shown in broken lines in FIG. 1, this seal may alternatively be positioned on the cylinder wall.) An alternate way of providing a two-way seal would be having an O-ring with a backup or sacrificial seal on each side but this would increase friction and consume considerably more axial space. Also, the surface area of seal 39 in frictional contact with cylinder 36 is reduced by designing piston 34 to have a small diameter.

Piston cylinder 36 is a part of body extension 38 which is secured to body 10 by wire 40 in this embodiment, although other means of securing these parts together may also be used. Body extension 38 has an annular groove containing seals 42. Seals 42 include the customary O-ring in the inner part of the groove and an outer ring which seals high pressure fluid in both directions. A conventional O-ring, backed-up on each side, or other bi-directional high pressure sealing means can be used. Body extension 38 includes radial ports 44 which communicate with cavity 45 located behind piston head 46. Ports 44 insure that no hydraulic pressure in cavity 45 will resist the opening movement of piston head 46, nor will any vacuum retard its closing movement. Ports 48 in body extension 38 are the primary exhaust ports of the valve.

Valve inlet 50 is secured to body extension 38 (by threads in the embodiment actually built; however, other means for joining these parts may also be used) and has valve seat 52 at its inner end. Valve seat 52 is lapped to provide a spherical surface (it could be conical or of any configuration to provide sealing means with piston head 46) and cooperates with the face of piston head 46 to open or close the passage from the inlet to outlet ports 48. The piston face has two parts; annular extension 54 and concave conical face 56. The inner circumference of annular extension 54 provides the seal with seat 52. It has been found that the structure of previous valves in which fluid flows past the piston face in its path to the outlet ports tends to result in valve closing forces due to Bernoulli effects. These forces cause valve chatter and are essentially eliminated with the design of the present invention because fluid flows initially through the gap between the spherical surface of seat 52 and the corner or inner circumference of annular extension 54 which has no piston face area upon which the flow can produce closing force.

It will be noted that passage 58 through piston 46 will admit the pressurized fluid at inlet 50 to pressurize spring chamber 12. Unrestricted flow into and out of spring chamber 12 is achieved by passages 59 between passage 58 and spring chamber 12. Pressurizing spring chamber 12 provides hydraulic pressure, acting on a specific piston area, which assists spring 14 in resisting opening pressure and provides damping which also reduces valve chatter. The instability problem experienced with differential relief valves having the spring chamber at downstream pressure do not occur in the valve of the present invention. Pure relieving pressure forces only work on specific areas on each side of the piston. The piston is not influenced by flow forces, which result from velocity and turbulence, and which are vague and not predictable. The high pressure within spring chamber 12 also compresses any air therein to an extremely low volume and, in the presence of continuing pressure, into solution. Moreover, it will be noted from FIG. 1 that piston areas on each side of the piston which are exposed to the inlet pressure are different only to the extent that differential area is produced. Almost 50 percent of total piston face area (both sides) is exposed to the pressure which is being relieved. Conventional valves typically have less than 15 percent exposed to pressure, the remainder to fluctuating downstream pressure. The resulting system embodied by this invention is stiff and inherently stable. Destabilizing conditions exist in fluid power circuits which can dictate the need for viscous damping. In such a situation, the preferred embodiment permits pressurized viscous damping through control of the number and diameter of passages 59 or, the diameter of passage 58. Viscous damping is preferred to friction damping because it has no effect upon hysteresis and reseat or upon valve accuracy. Pressure damping is preferred to low or return pressure damping because it is predictable and consistently effective. Using the pressurized fluid for damping also permits a larger orifice size, therefore not impairing the valves ability to respond quickly.

In operation, when the set pressure is reached, piston 34 will be moved back into spring chamber 12. This movement is accompanied by the displacement of fluid at inlet pressure from spring chamber 12 and through passages 59 and 58, permitting smooth but rapid opening of the inlet port. As inlet pressure decreases, spring 14 will move piston 34 outwardly with only minimum resistance against this movement contributed by the low friction seal 39. Testing has shown the pressure with decreasing flow (valve closing) to be within 5 percent of the pressure with increasing flow—a measure of hysterisis.

Figure 2:
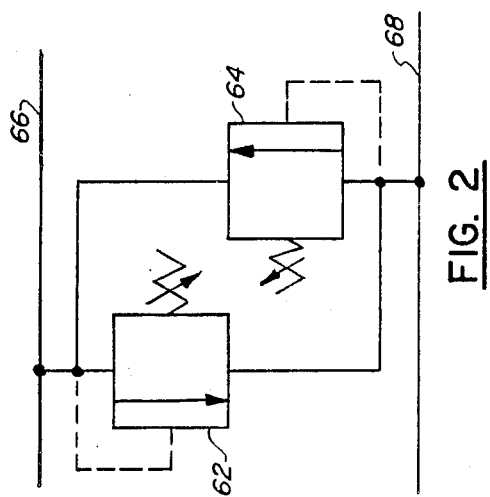
FIG. 2 is a block diagram of a circuit in which the relief valve may be used.

Referring next to FIG. 2, direct-acting, differential relief valves 62 and 64 are symbolically shown in a cross over or dual relief configuration. Hydraulic lines 66 and 68 may alternately be the high and low pressure lines, such as where an actuator has one side connected to each line. As the actuator moves, displacing fluid from one side, the high pressure port of the relief valve connected to that line, say line 66, opens with excess pressure and exhausts fluid to the other line, 68 in this example. This relieves the pressure and, when the actuator displaces equal volumes in each direction, it prevents cavitation in the system. It is important in such an application that each valve have the capability to resist high pressures in the reverse direction, i.e. from the outlet ports to the inlet port because the same pressure being applied at the inlet port of one valve is applied to the outlet port of the other valve. In the valves of the present invention it is evident from inspection of the drawings that any net force from the outlet port will tend to close the valve and have no detrimental effect upon the valve parts exposed to this closing pressure, making these valves suitable for this purpose.

Although a direct-acting, differential relief valve in accordance with the invention has been illustrated and described, it will be evident that changes and modifications can be made without departing from the spirit of the invention and the scope of the appended claims.

I claim:

1. A direct-acting differential piston relief valve comprising:
   a body having a longitudinally extending bore therein;
   said bore having first and second ends;
   a spring chamber closure secured for longitudinal adjustment to said body at said first end of said bore;
   a body extension secured to said body at said second end of said bore;
   a valve seat secured to said body extension;
   said valve seat defining a valve inlet port;
   a plurality of radially extending passages through said body extension adjacent to said valve seat defining a valve outlet port;
   a spring chamber in said body defined by said bore, said spring chamber closure and said body extension;
   said body extension having a longitudinal bore therethrough forming a piston cylinder;
   a piston slideably supported in said piston cylinder forming an interface therewith;
   an annular low friction seal in a groove at said interface of said piston and said piston cylinder;
   said piston having a head extending radially outwardly from said piston, whereby said piston has a smaller outside diameter than said piston head;
   said piston head having a longitudinally extending annular extension thereon;
   an inner edge on said piston head annular extension;
   said inner edge forming a seal with said valve seat when said inner edge abuts said valve seat, whereby said piston has no piston face area extending radially inwardly of said inner edge upon which low pressure produced by Bernoulli effects can act;
   a first spring guide in said spring chamber abutting said spring chamber closure;
   a second spring guide in said spring chamber abutting said piston;
   a coil spring axially supported in said spring chamber to transmit spring force against first and second spring guides, whereby said spring tends to close said valve;
   said first and second spring guides having a spherical surface on one side and a portion fitting within the coils of said spring on the other side transmitting the force exerted by said spring only in the axial direction;
   a passage extending through said piston between said spring chamber and said inlet port;
   an annular cavity between said piston head and said body extension; and
   a plurality of radially extending passages through said body extension from said annular cavity, whereby fluid contained in said annular cavity can be readily expelled.

2. A direct-acting differential relief valve in accordance with claim 1 wherein:
   said annular extension of said piston head has an inner surface having a right circular cylinder configuration.

3. A direct-acting differential relief valve in accordance with claim 1 wherein:

said spring chamber closure has a recess for receiving a segment of said spherical surface of said first spring guide; and said piston has a recess for receiving a segment of said spherical surface of said second spring guide.

4. A direct-acting differential relief valve in accordance with claim 1 wherein:

said groove is on said piston and said groove is a circumferential groove having a base;

an O-ring is positioned in said groove adjacent to said base; and said annular low friction seal is positioned in said groove adjacent to said O-ring.

5. A direct-acting differential relief valve in accordance with claim 1 wherein:

said groove is on said piston cylinder and said groove is a circumferential groove having a base;

an O-ring is positioned in said groove adjacent to said base; and said annular low friction seal is positioned in said groove adjacent to said O-ring.

6. A direct-acting differential relief valve in accordance with claim 1 wherein:

said passage extending through said piston includes no restrictions to the flow of fluid.

7. A direct-acting differential relief valve in accordance with claim 1 wherein:

said valve seat is removeably mounted on said body extension, whereby said piston can be removed by removing said valve seat.

8. A direct-acting differential piston relief valve comprising:

a body having a spring chamber intermediately located between its ends;

a coil spring contained in said chamber;

a spring guide at each end of said spring means;

each of said spring guides having a spherical surface on one side and a portion fitting within the coils of said spring on the other side;

spring chamber closure means sealingly mounted at one end of said spring chamber;

said spring chamber closure means having threads mating with threads extending through one end of said body, whereby the force exerted by said spring means can be adjusted;

a body extension secured and sealed to the other end of said body and having a portion extending radially inwardly from said body;

said body extension having a longitudinal bore therethrough forming a piston cylinder;

a piston slideably supported in said piston cylinder and forming an interface therewith;

an annular low friction seal at said interface of said piston and said piston cylinder;

said piston having a piston head extending radially outwardly from said piston, whereby said piston has a smaller outside diameter that said piston head;

an annular chamber between said piston head and said inwardly extending portion of said body extension;

said piston head having a longitudinally extending annular extension thereon;

an inner edge on said piston head annular extension;

a valve seat removeably mounted on said body extension forming a sealing closure with said inner edge of said piston head annular extension without leaving any piston face area within said sealing closure for low pressure produced by Bernoulli effects to act upon;

said valve seat and said inner edge of said piston head annular extension providing a closeable inlet port for said valve;

said piston having one face adjacent to said spring chamber;

a passage between said piston face and said spring chamber, whereby said spring chamber will contain fluid at the inlet pressure;

a plurality of radially extending outlet ports in said body extension adjacent to said valve seat, whereby fluid can pass from said inlet port to said outlet ports when said sealing means is displaced from said seat; and a plurality of radially extending ports in said body extension adjacent to said annular chamber, whereby fluid contained in said chamber is readily expelled when said valve opens.

9. A direct-acting differential piston relief valve in accordance with claim 8 wherein:

said spring chamber closure means has a recess in the center thereof on the spring facing surface for receiving a segment of said spherical surface on one of said spring guides; and said one face of said piston has a recess therein for receiving a segment of said spherical surface on the other of said spring guides, whereby said piston head will be biased towards said valve seat.

10. A direct-acting differential piston relief valve in accordance with claim 8 wherein:

said passage between said piston face and spring chamber has no restrictions therein.

11. A direct-acting differential piston relief valve in accordance with claim 8 wherein:

said piston has a circumferential groove having a base;

an O-ring is positioned in said groove adjacent to said base; and said annular low friction seal is positioned in said groove adjacent to said O-ring.

12. A direct-acting differential piston relief valve in accordance with claim 8 wherein:

said piston cylinder has a circumferential groove having a base;

an O-ring is positioned in said groove adjacent to said base; and said annular low friction seal is positioned in said groove adjacent to said O-ring.

13. A direct-acting differential piston relief valve comprising:

a body having a spring chamber intermediately located between its ends;

a coil spring contained in said chamber;

a spring guide at each end of said spring;

each of said spring guides having a first side having a spherical surface thereon and a second side having a portion fitting within the coils of said spring;

spring chamber closure means sealingly mounted at one end of said spring chamber;

said spring chamber closure means having a recess in the center thereof on the spring facing surface for receiving said ball mounted on one of said spring guides;

said spring chamber closure means having threads mating with threads extending through one end of said body, whereby the force exerted by said spring can be adjusted;

a body extension secured and sealed to the other end of said body and having a portion extending radially inwardly from said body;

said body extension having a longitudinal bore therethrough forming a piston cylinder;

a piston slideably supported in said piston cylinder and forming an interface therewith;

an annular low friction seal in a groove at said interface of said piston and said piston cylinder;

said piston having a piston head extending radially outwardly from said piston, whereby said piston has a smaller outside diameter that said piston head;

an annular chamber between said piston head and said inwardly extending portion of said body extension;

said piston head having a longitudinally extending annular extension thereon;

an inner edge on said piston head annular extension;

a valve seat removeably mounted on said body extension forming a sealing closure with said inner edge of said piston head annular extension without leaving any piston face area within said sealing closure for low pressure produced by Bernoulli effects to act upon;

said valve seat and said inner edge of said piston head annular extension providing a closeable inlet port for said valve;

said piston having one face adjacent to said spring chamber;

said one face having a recess therein for receiving said ball on the other of said spring guides, whereby said piston head will be biased towards said valve seat;

a passage between said piston face and said spring chamber having no restrictions therein, whereby said spring chamber will contain fluid at the inlet pressure;

a plurality of radially extending outlet ports in said body extension adjacent to said valve seat, whereby fluid can pass from said inlet port to said outlet ports when said sealing means is displaced from said seat; and a plurality of radially extending ports in said body extension adjacent to said annular chamber, whereby fluid contained in said chamber is readily expelled when said valve opens.

* * * * *